United States Patent [19]

Hayashi et al.

[11] Patent Number: 5,216,093
[45] Date of Patent: Jun. 1, 1993

[54] LOW-TEMPERATURE CURING EPOXY RESIN COMPOSITION

[75] Inventors: Shuichi Hayashi, Nishinomiya; Tetsuya Kojimoto, Nagakakyo, both of Japan

[73] Assignee: Sumitomo Rubber Industries, Ltd., Kobe, Japan

[21] Appl. No.: 615,542

[22] Filed: Nov. 19, 1990

[30] Foreign Application Priority Data

Dec. 20, 1989 [JP] Japan .................... 1-332242

[51] Int. Cl.$^5$ .................... C08F 283/00; 208G 8/28
[52] U.S. Cl. .................... 525/484; 525/524; 525/526; 525/530
[58] Field of Search .................... 525/530, 524, 526, 484

[56] References Cited

U.S. PATENT DOCUMENTS

| | | | |
|---|---|---|---|
| 3,239,580 | 3/1966 | Pendleton et al. | |
| 3,624,178 | 11/1971 | Lohse et al. | |
| 4,632,970 | 12/1986 | Hiza et al. | 528/27 |
| 4,861,832 | 8/1989 | Walsh | 525/113 |

FOREIGN PATENT DOCUMENTS

| | | |
|---|---|---|
| 52-008043 | 7/1977 | Japan . |
| 61-108678 | 5/1986 | Japan . |
| 62-273225 | 2/1987 | Japan . |
| 1170613 | 3/1989 | Japan . |

OTHER PUBLICATIONS

European Search Report.

*Primary Examiner*—John C. Bleutge
*Assistant Examiner*—Helen F. Lee
*Attorney, Agent, or Firm*—Nikaido, Marmelstein, Murray & Oram

[57] ABSTRACT

The present invention discloses a low-temperature curing epoxy resin composition including: an epoxy resin main agent to which unsaturated acid ester of polyhydric alcohol is added and which contains epoxy resin having urethane bonds in the molecules thereof; and a curing agent containing an alicyclic amine compound. This epoxy resin composition may be rapidly cured even at a low temperature and presents a good work efficiency. This epoxy resin composition may be prepared as a cured body excellent in resistance to hot water, mechanical strength, impact resistance and the like.

10 Claims, No Drawings

LOW-TEMPERATURE CURING EPOXY RESIN COMPOSITION

BACKGROUND OF THE INVENTION

The present invention relates to a low-temperature curing epoxy resin composition, and more particularly to an epoxy resin composition which may be rapidly cured at a low temperature and which may be prepared as a cured body excellent in wear resistance, adhensiveness and resistance to hot water.

Epoxy resin is excellent in heat resistance, wear resistance, water resistance and the like and has been conventionally applied to a variety of uses such as adhesives, a coating agent and the like.

Most of the epoxy resin is of the two-part curing type. Used as a curing agent is aliphatic amine, aromatic amine, acid anhydride or the like containing active hydrogen in the molecules thereof.

However, when such a curing agent is used, the reactivity of the curing agent is considerably low at a low temperature not higher than 5° C. Further, the resultant cured body is poor in mechanical strength. Accordingly, as an epoxy resin curing agent to be used under a low-temperature condition, mercaptan or low-molecular-weight aliphatic amine has been conventionally used.

The use of such a curing agent presents the following problems.

(1) When mercaptan is used as the curing agent, the mercaptan gives out an extremely offensive smell, thus lowering the work efficiency. Further, the resultant cured body is very fragile and is also very poor in resistance to hot water.

(2) When low-molecular-weight aliphatic amine is used as the curing agent, the low-molecular-weight aliphatic amine is volatile so that the resin composition is susceptible to change and is therefore unstable. Further, the low-molecular-weight aliphatic amine is an irritant to the skin, thus lowering the work efficiency. Further, the resultant cured body is fragile because its cross-linking density is too high.

As other method of curing the epoxy resin at a low temperature than the method above-mentioned, there has been proposed a method including a step of adding, to epoxy resin, unsaturated acid ester of polyhydric alcohol which may rapidly achieve an addition reaction (Michael reaction) with amine even at a low temperature, so that the reactivity of the epoxy resin at a low temperature is improved with the use of generated reaction heat (Japanese Patent Unexamined Publication No. 8043/1977).

However, the number of functional groups per molecule in unsaturated acid ester of polyhydric alcohol is generally as small as 1 to 3. Accordingly, when unsaturated acid ester of polyhydric alcohol is added to epoxy resin, the resultant cured body presents a small cross-linking density, so that the mechanical strength thereof is insufficient. Further, such a method presents the defect that the cured body is considerably lowered in resistance to hot water due to the addition of unsaturated acid ester of polyhydric alcohol.

Alternately, there has been proposed a method using, as a main agent, a mixture of epoxy resin with unsaturated acid ester of polyfunctional polyhydric alcohol having 3 to 6 functional groups per one molecule, and also using polyamide as a curing agent, thereby to improve the resistance to hot water of the resultant cured body (Japanese Patent Unexamined Publication No. 179524/1987). However, under such severe conditions that the resultant cured body is immersed in hot water of about 70° to 100° C. for several weeks, the cured body presents no sufficient strength and presents tucks on the surface thereof.

Meanwhile, the inventors of the present invention have obtained a low-temperature curing epoxy resin composition by curing, with an alicyclic amine compound, an epoxy resin main agent which contains unsaturated acid ester of polyfunctional polyhydric alcohol having 3 to 6 functional groups at a ratio of 5 to 30 parts by weight for 100 parts of the epoxy resin main agent. This composition may be cured even at a low temperature and may be prepared as a cured body excellent in resistance to hot water. However, such a cured body is slightly fragile and therefore apt to be broken due to a shock or the like.

SUMMARY OF THE INVENTION

It is a main object of the present invention to provide a low-temperature curing epoxy resin composition which may be rapidly cured even at a low temperature and which may be prepared as a cured body excellent in resistance to hot water, mechanical strength, impact resistance and the like.

It is another object of the present invention to provide a low-temperature curing epoxy resin composition which gives no offensive smell and which is not an irritant to the skin, thus providing a good work efficiency.

The low-temperature curing epoxy resin composition in accordance with the present invention comprises:

(a) an epoxy resin main agent to which unsaturated acid ester of polyhydric alcohol is added and which contains epoxy resin having urethane bonds in the molecules thereof; and (b) a curing agent containing an alicyclic amine compound.

Preferably, the unsaturated acid ester of polyhydric alcohol has 3 to 6 functional groups per one molecule.

Preferably, the epoxy resin having urethane bonds in the molecules thereof is contained at a ratio of 5 to 35 parts by weight for 100 parts by weight of the epoxy resin main agent.

Preferably, the alicyclic amine compound is contained at a ratio of 30 to 100% of the all reaction equivalent weight of the curing agent.

Preferably, the curing agent is contained in an equivalent weight of 0.8 to 1.2 time the reaction equivalent weight of the epoxy resin main agent.

In the low-temperature curing epoxy resin composition having the composition above-mentioned, the unsaturated acid ester of polyhydric alcohol improves the reactivity of the epoxy resin with the alicyclic amine compound serving as the curing agent, thereby to rapidly accelerate the curing reaction even at a low temperature. Further, the epoxy resin having urethane bonds in the molecules thereof serves as a so-called soft segment to impart the flexibility to the resultant cured body. This contributes to improvements of the cured body in impact resistance and mechanical strength (toughness and the like).

Further, the alicyclic amine compound used as the curing agent prevents such decrease in resistance to hot water of the cured body as caused by the addition of the unsaturated acid ester of polyhydric alcohol to the epoxy resin. The alicyclic amine presents a lower reactivity but a greater hydrophobic property as compared with aliphatic amine, and presents a higher reactivity but a smaller hydrophobic nature as compared with aromatic amine, so that the alicyclic amine is well balanced as to the reactivity and the hydrophobic property. This is considered to be a reason why the alicyclic amine compound prevents such decrease in resistance to hot water of the cured body as caused by the addition of the unsaturated acid ester of polyhydric alcohol.

Further, both the unsaturated acid ester of polyhydric alcohol and the alicyclic amine compound give no offensive smell as is the case of mercaptan, and are not irritating to the skin as is the case of low-molecular-weight aliphatic amine. This involves no likelihood of decrease in work efficiency.

DETAILED DESCRIPTION OF THE INVENTION

The following description will discuss in detail the present invention.

According to the present invention, the epoxy resin main agent is obtained by mixing epoxy resin which is normally used, with epoxy resin having urethane bonds in the molecules thereof and unsaturated acid ester of polyhydric alcohol.

As the first-mentioned epoxy resin, there may be used any type of epoxy resin which is normally used. Examples of the epoxy resin include bisphenol A-type epoxy resin, bisphenol F-type epoxy resin, bisphenol AD-type epoxy resin, novolac-type epoxy resin, halogenated bisphenol A-type epoxy resin, glycidyl-type epoxy resin, glycidyl ester-type epoxy resin, alicyclic epoxy resin and the like. These examples may be used alone or in combination of plural types.

Examples of commercially available products of the epoxy resin above-mentioned include Epikote 828, Epikote 834, Epikote 1001, Epikote 807, Epikote 152, Epikote 5050, Epikote 604 and Epikote 871 (which are trademarks of Yuka-Shell Epoxy Co., Ltd.), ARALDITE GY250 and ARALDITE GY260 (which are trademarks of CIBA-GEIGY Co., Ltd.), Sumiepoxy ELA115 and Sumiepoxy ELA127 (which are trademarks of Sumitomo Chemical Company, Limited), ACR Epoxy R82 and ACR Epoxy R86 (which are trademarks of ACR Co., Ltd.), DER 661 and DER 667 (which are trademarks of Dow Chemical Co., Ltd.), and EPICLON N665 (which is a trademark of Dainippon Ink and Chemicals, Inc.). These examples may be used alone or in combination of plural types.

To lower the viscosity of the low-temperature curing epoxy resin composition to improve the work efficiency, there may be used, instead of a part of the epoxy resin, low-molecular-weight and low-viscosity multifunctional or monofunctional epoxide or the like. In this case, such epoxide may be contained preferably in an amount of not greater than 35% by weight of all the epoxy resin.

As the epoxy resin having urethane bonds in the molecules thereof, there may be used any type of epoxy resin which has urethane bonds in the molecules thereof. As an example of a segment having an urethane bond, there may be mentioned a segment as obtained by cross-linking, with the use of an amine compound, (i) an urethane polymer as obtained by reacting toluene diisocyanate (hereinafter referred to as TDI) or diphenylmethane-4,4-diisocyanate (hereinafter referred to as MDI) with polyol having a hydroxyl group such as polypropylene glycol (hereinafter referred to as PPG) or polyethylene glycol (hereinafter referred to as PEG), and (ii) epoxy resin such as bisphenol A-type epoxy resin, bisphenol F-type epoxy resin, bisphenol AD-type epoxy resin, novolac-type epoxy resin or the like.

Preferable is a segment obtained by cross-linking an urethane polymer obtained by reacting the TDI with the PPG and the epoxy resin, with the use of an amine compound.

According to the present invention, the epoxy resin having urethane bonds in the molecules thereof is preferably contained at a ratio of 5 to 35 parts by weight for 100 parts by weight of the epoxy resin main agent. If the concentration of the epoxy resin having urethane bonds in the molecules thereof exceeds the range above-mentioned, the resultant cured body is lowered in resistance to hot water. On the other hand, if the concentration of this epoxy resin is below the range above-mentioned, the resultant cured body is not improved in resistance to hot water and mechanical strength, thus producing no intended effect of the use of the epoxy resin having urethane bonds in the molecules thereof. Thus, neither over- nor under-concentration is preferable.

According to the present invention, there may be preferably used, as the epoxy resin, bisphenol-type epoxy resin containing bisphenol A, bisphenol F or bisphenol AD at a ratio of 60 to 100% of the all epoxy equivalent weight. If the concentration of the bisphenol-type epoxy resin exceeds over the range above-mentioned, the resultant cured body becomes fragile, thus assuring no sufficient mechanical strength. On the other hand, if the concentration of the bisphenol-type epoxy resin is below the range above-mentioned, the resultant cured body is lowered in mechanical strength and resistance to hot water. Thus, neither over- nor under-concentration is preferable.

The term "all epoxy equivalent weight" herein used refers to the total sum of the epoxy equivalent weight of the normal epoxy resin and the epoxy equivalent weight of the epoxy resin having urethane bonds in the molecules thereof.

Preferably, the unsaturated acid ester of polyhydric alcohol has 3 to 6 functional groups (ester groups or the like) per one molecule, and more preferably, the unsaturated acid ester of polyhydric alcohol has 5 or 6 functional groups per molecules and also has 1000 molecules or less. That is, as the number of the functional groups in the unsaturated acid ester of polyhydric alcohol is increased, the resultant cured body is provided with better mechanical strength without the cross-linking density thereof decreased.

Examples of the polyhydric alcohol include pentaerythritol, dipentaerythritol and the like. Examples of the unsaturated acid include acrylic acid, methacrylic acid, crotonic acid and the like.

In the unsaturated acid ester of polyhydric alcohol, the whole or part of the functional groups of the polyhydric alcohol is ester-bonded to unsaturated acid. Examples of the unsaturated acid ester of polyhydric alcohol include dipentaerythritol pentacrylate, dipentaerythritol hexacrylate and the like. Other example of the unsaturated acid ester of polyhydric alcohol may have a skeleton in which a plurality of polyhydric alcohols are being ester-bonded to polybasic acid (fumaric acid, maleic acid, phthalic acid or the like) and in which unsaturated acid is bonded to the functional groups of the polyhydric alcohol.

Examples of commercially available products of such unsaturated acid ester of polyhydric alcohol include Aronix M400 (which is a trademark of Toagosei Chemical Industry Co., Ltd.), KAYARAD DPHA and KAYARAD D310 (which are trademarks of Nippon Kayaku Co., Ltd.).

According to the present invention, the unsaturated acid ester of polyhydric alcohol is preferably contained at a ratio of 5 to 40 parts by weight for 100 parts by weight of the epoxy resin main agent. If the concentration of the unsaturated acid ester of polyhydric alcohol exceeds the range above-mentioned, the effect of accelerating the curing reaction is further enhanced, but the resultant cured body is considerably decreased in resistance to hot water. On the other hand, if the concentration is below the range above-mentioned, the effect of accelerating the curing reaction is small, thus failing to sufficiently improve the curing properties at a low temperature. Thus, neither over- nor under-concentration is preferable.

According to the present invention, there may be used, as the alicyclic amine compound serving as the curing agent, one which is generally used as an epoxy resin curing agent. Examples of the alicyclic amine compound include isophorone diamine, methylene diamine, N-aminoethyl piperazine, 3,9-bis(3-aminopropyl)-2,4,8,10-tetraoxyspiro(5,5)-undecane adduct, bis(4-amino-3-methylcyclohexyl)-methane, hydrogenated diaminodiphenyl methane and the like. Of these, isophorone diamine is preferable.

Examples of commercially available products of the alicyclic amine compound include Gripcoat H326 (which is a trademark of Sumitomo Rubber Industries Ltd.), ARALDITE XB3140 (which is a trademark of CIBA-GEIGY Co., Ltd.), Versamine C30 (which is a trademark of Henkel-Hakusui Co., Ltd.), Epicure 3021 (which is a trademark of Yuka-Shell Co., Ltd.) and the like.

Preferably, the alicyclic amine compound is contained at a ratio of 30 to 100% of the all reaction equivalent weight of the curing agent. If the all reaction equivalent weight of the alicyclic amine compound exceeds the range above-mentioned, amine which does not contribute to the reaction, remains and works like a plasticizer. This injures the mechanical properties and water resistance of the epoxy resin which are originally good. On the other hand, if this all reaction equivalent weight is below the range above-mentioned, the curing speed is retarded and the resultant cured body is decreased in cross-linking density to assure no sufficient strength. Further, the resistance to hot water may be decreased dependent on the mixing amount of the unsaturated acid ester of polyhydric alcohol. Thus, neither excessive- nor under-use is preferable.

The alicyclic amine compound may be used alone. However, to accelerate the curing reaction, there may be used an alicyclic amine compound of the two-component system in which any of a variety of Mannich modified amines is being added in such an amount as not to decrease the resistance to hot water of the resultant cured body.

Examples of the Mannich modified amines include a Mannich modified compound of methaxylene diamine, a Mannich modified compound of triethylenetetramine, a Mannich modified compound of diethylene triamine and the like.

Examples of commercially available products of the Mannich modified amine include Gripcoat H312 (which is a trademark of Sumitomo Rubber Industries Ltd.), Epicure 3012 (which is a trademark of Yuka-Shell Epoxy Co., Ltd.), Versamine I-368 (which is a trademark of Henkel-Hakusui Co., Ltd.) and the like.

Preferably, the Mannich modified amine is added at a ratio of 5 to 50% of the all reaction equivalent weight of the curing agent. Excessive use of the Mannich modified amine over the range above-mentioned, results in ineffective prevention of such decrease in resistance to hot water of the resultant cured body as caused by the addition of the unsaturated acid ester of polyhydric alcohol. Underuse of the Mannich modified amine below the range above-mentioned causes the reaction speed to become slower. Thus, neither excessive- nor under-use is preferable.

Preferably, the curing agent is contained in an equivalent weight of 0.8 to 1.2 time the reaction equivalent weight of the epoxy resin main agent. Excessive use of the curing agent over the range above-mentioned not only decreases the mechanical strength of the resultant cured body, but also shortens the pot life (usable period of time) thereof, making it difficult to handle the same. Underuse of the curing agent below the range above-mentioned causes the curing reaction speed to become slower or results in failure of curing in the worst case. Thus, neither excessive- nor under-use is preferable.

The low-temperature curing epoxy resin composition of the present invention may be rapidly cured at a low temperature without heating, and may be prepared as a cured body excellent in wear resistance, toughness, resistance to hot water and impact resistance. Accordingly, it may be expected to apply this composition to a variety of industrial fields. For example, the low-temperature curing epoxy resin composition may be used for preparing, at ordinary temperature, fiber reinforced plastic (hereinafter referred to as FRP) which is generally prepared through a heating-setting reaction, or may be used as the floor material of a food factory adapted to be often cleaned with hot water at 70° to 100° C. Further, this composition may be used as adhesives which may be used in a wide range of temperature, or may be applied to various construction resins such as a coating floor or the like. According to the applications, there may be added, as necessary, a filler such as silica sand, talc, calcium carbonate, silica powder, clay, barium sulfate powder, aluminium hydroxide, plastic powder, glass powder, metallic powder or the like, in an amount up to about 2000 parts by weight for 100 parts by weight of the epoxy resin main agent. Also, pigment or the like may be added in a desired amount.

The low-temperature curing epoxy resin composition of the present invention comprises an epoxy resin main agent to which unsaturated acid ester of polyhydric alcohol is added and which contains epoxy resin having urethane bonds in the molecules thereof, and a curing agent containing an alicyclic amine compound. Accordingly, this composition may be rapidly cured even at a low temperature of 5° C. at which such a composition containing conventional epoxy resin cannot be cured, and may be prepared as a cured body excellent in toughness, impact resistance and resistance to hot water. Thus, by making the best use of such features as to be rapidly cured at a low temperature and as to be prepared as a cured body excellent in toughness and resistance to hot water, the low-temperature curing epoxy resin composition of the present invention may be suitably used for a variety of applications such as FRP matrix or structural adhesives of the ordinary-temperature curing type, adhesives of the low-temperature curing type, construction resin such as a coating floor or resin mortar and the like. Accordingly, the industrial value of the low-temperature curing epoxy resin composition of the present invention is very high.

EXAMPLES

The following description will discuss in more detail the present invention with reference to examples thereof.

Examples 1 to 3 and Comparative Examples 1 to 4

PREPARATION OF MAIN AGENT COMPONENTS

The following main agent components were prepared at the ratios shown in Table 1.

Epoxy resin

Epikote 828 (which is a trademark of Yuka-Shell Epoxy Co., Ltd. and which is hereinafter referred to as the main agent component A).

Epoxy resin having urethane bonds in the molecules

XB3674 (which is a trademark of CIBA-GEIGY Co., Ltd. and which is hereinafter referred to as the main agent component B).

Unsaturated acid ester of polyhydric alcohol

Aronix M400 (which is a trademark of Toagosei Chemical Industry Co., Ltd. and which is hereinafter referred to as the main agent component C).

In the two different epoxy resins above-mentioned, the main agent component A is bisphenol-type epoxy resin (bisphenol A-type), while the main agent component B is other epoxy resin than the bisphenol-type epoxy resin.

PREPARATION OF CURING AGENTS

The following curing agent components were prepared at the ratios shown in Table 1.

Alicyclic amine compound

XB3140 (which is a trademark of CIBA-GEIGY Co., Ltd. and which is hereinafter referred to as the curing agent component A)

Mannich modified amine compound

H312 (which is a trademark of Sumitomo Rubber Industries Ltd. and which is hereinafter referred to as the curing agent component B)

Versamine I-368 (which is a trademark of Henkel-Hakusui Co., Ltd. and which is hereinafter referred to as the curing agent component C)

EVALUATION TEST

To investigate the thin-film curing period of time, the following test was conducted on the low-temperature curing epoxy resin composition obtained in each of Examples and Comparative Examples.

The low-temperature curing epoxy resin composition obtained in each of Examples and Comparative Examples was applied in a thickness of 100 μm and there was measured a period of time, as measured by a drying recorder, during which secondary linear traces marked on each of the resulting cured films disappeared at 0° C.

The results of the evaluation test above-mentioned are shown in Table 1, in which "%" in each of the columns of main agent components A to C refers to % by weight, while "%" in each of the columns of curing agent components A to C refers to % for the all reaction equivalent weight of the epoxy resin main agent.

TABLE 1

|  | Example | | | Comparative Example | | | |
| --- | --- | --- | --- | --- | --- | --- | --- |
|  | 1 | 2 | 3 | 1 | 2 | 3 | 4 |
| Main agent component A (%) | 70 | 70 | 70 | 90 | 90 | 80 | 80 |
| Main agent component B (%) | 10 | 10 | 10 | 10 | 10 | 0 | 0 |
| Main agent component C (%) | 20 | 20 | 20 | 0 | 0 | 20 | 20 |
| Curing agent component A (%) | 100 | 70 | 70 | 100 | 0 | 100 | 70 |
| Curing agent component B (%) | 0 | 30 | 0 | 0 | 100 | 0 | 30 |
| Curing agent component C (%) | 0 | 0 | 30 | 0 | 0 | 0 | 0 |
| Concentration of Bisphenol compound (%) | 90 | 90 | 90 | 92 | 92 | 100 | 100 |
| Thin film curing time (0° C.) (hour) | 30 | 18 | 17 | Not Cured | Not Cured | 28 | 16 |

As apparent from Table 1, the epoxy resin compositions of Comparative Examples 1 and 2 could not be cured at a low temperature (0° C.) since they contain no unsaturated acid ester of polyhydric alcohol (the main agent component C). As also apparent from Table 1, the curing periods of time of Examples 1 to 3 and Comparative Examples 3 and 4 containing the main agent component C are substantially equal to one another so that the low-temperature curing properties thereof are substantially equal to one another.

Examples 4 to 7 and Comparative Examples 5 to 7

With the use of main agent components A to C and curing agent components A and B identical with those used in Example 1, low-temperature curing epoxy resin compositions were prepared in the same manner as in Example 1, except that the components above-mentioned were mixed at the ratios shown in Table 2.

EVALUATION TESTS

To investigate the resistance to hot water and mechanical strength, the following tests were conducted on the low-temperature curing epoxy resin composition obtained in each of Examples 4 to 7 and Comparative Examples 5 to 7:

(a) Evaluation test of resistance to hot water

The low-temperature curing epoxy resin composition obtained in each of Examples 4 to 7 and Comparative Examples 5 to 7 was poured into a No. 1 dumbbell at ordinary temperature according to JIS K7113. After each composition had been allowed to stand at a room temperature for 12 hours, each resultant cured body was immersed in hot water at 70° C. for 28 days, and the tensile strength (kg/cm$^2$) thereof was then measured.

(b) Evaluation of mechanical strength

There was calculated the product by multiplying each tensile strength obtained in the test of resistance to hot water above-mentioned, by breaking extension (%). This product is defined as a value representing toughness. It is considered that, as this value is greater, the resin is tougher and more excellent in mechanical strength and impact resistance.

The results of the evaluation tests above-mentioned are shown in Table 2, in which "%" in each of the columns of main agent components A to C refers to % by weight, while "%" in each of the columns of curing agent components A and B refers to % for the reaction equivalent weight of the epoxy resin main agent.

TABLE 2

|  | Example | | | | Comparative Example | | |
|---|---|---|---|---|---|---|---|
|  | 4 | 5 | 6 | 7 | 5 | 6 | 7 |
| Main agent component A (%) | 75 | 70 | 50 | 45 | 40 | 80 | 100 |
| Main agent component B (%) | 5 | 10 | 30 | 35 | 40 | 0 | 0 |
| Main agent component C (%) | 20 | 20 | 20 | 20 | 20 | 20 | 0 |
| Curing agent component A (%) | 70 | 70 | 70 | 70 | 70 | 70 | 70 |
| Curing agent component B (%) | 30 | 30 | 30 | 30 | 30 | 30 | 30 |
| Concentration of Bisphenol compound (%) | 95 | 90 | 69 | 63 | 57 | 100 | 100 |
| Resistance to hot water (tensile strength) (kg/cm$^2$) | 250 | 280 | 200 | 170 | 110 | 220 | 350 |
| Strength × extension. | 700 | 1400 | 1000 | 700 | 330 | 300 | 700 |

As apparent from Table 2, Examples 4 to 7 containing the epoxy resin having urethane bonds in the molecules thereof (the main agent component B) are considerably increased in toughness as compared with Comparative Example 6 which does not contain such epoxy resin. It is also apparent from Table 2 that Comparative Example 5 containing 40 parts by weight of the main agent component B is rather decreased in toughness. Comparative Example 7 is a normal epoxy resin composition and presents high resistance to hot water and high toughness. However, since it does not contain the unsaturated acid ester of polyhydric alcohol (the main agent component C), its curing speed at a low temperature is very slow so that it is not suitable for the application at a low temperature.

What is claimed is:

1. A low-temperature curing epoxy resin composition comprising:
    (a) a mixture of (i) an epoxy resin which does not contain urethane bonds in the molecule thereof selected from the group consisting of bisphenol-A based epoxy resins, bisphenol F based epoxy resins, and novolak based epoxy resins, (ii) an unsaturated acid ester of polyhydric alcohol and (iii) an epoxy resin having urethane bonds in the molecules thereof; and
    (b) a curing agent containing an alicyclic amine compound, such that when said resin composition is cured it possesses high resistance to hot water.

2. A low-temperature curing epoxy resin composition according to claim 1, wherein the unsaturated acid ester of polyhydric alcohol contains 3 to 6 functional groups per one molecule.

3. A low-temperature curing epoxy resin composition according to claim 1, wherein the epoxy resin having urethane bonds in the molecules thereof is contained at a ratio of 5 to 35 parts by weight for 100 parts by weight of the epoxy resin.

4. A low-temperature curing epoxy resin composition according to claim 1, wherein the alicyclic amine compound is contained at a ratio of 30 to 100% of the all reaction equivalent weight of the curing agent.

5. A low-temperature curing epoxy resin composition according to claim 1, wherein the curing agent is contained in an equivalent weight of 0.8 to 1.2 time the all reaction equivalent weight of the epoxy resin.

6. The low-temperature curing epoxy resin composition of claim 1, wherein said polyol is polypropylene glycol or polyethylene glycol.

7. The low-temperature curing epoxy resin composition of claim 1, wherein said alicyclic amine compound comprises: isophorone diamine.

8. The low-temperature curing epoxy resin composition of claim 1, wherein said polyhydric alcohol is selected from the group consisting of pentaerythritol and dipentaerythritol.

9. The low-temperature curing epoxy resin composition of claim 1, wherein said unsaturated acid is selected from the group consisting of acrylic acid, and methacrylic acid.

10. The low-temperature curing epoxy resin composition of claim 1, wherein a temperature of said hot water is at least 70° C.

* * * * *